US008816716B2

(12) United States Patent
Tokitsu et al.

(10) Patent No.: US 8,816,716 B2
(45) Date of Patent: Aug. 26, 2014

(54) DIAGNOSTIC APPARATUS FOR ERRONEOUS INSTALLATION OF POWER STORAGE STACKS AND VEHICLE

(75) Inventors: Ryutaro Tokitsu, Aichi (JP); Koichi Nagamine, Aichi (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 54 days.

(21) Appl. No.: 13/509,920

(22) PCT Filed: Feb. 14, 2011

(86) PCT No.: PCT/JP2011/000798
§ 371 (c)(1),
(2), (4) Date: May 15, 2012

(87) PCT Pub. No.: WO2012/111036
PCT Pub. Date: Aug. 23, 2012

(65) Prior Publication Data
US 2012/0242366 A1 Sep. 27, 2012

(51) Int. Cl.
*G01R 31/40* (2014.01)
(52) U.S. Cl.
USPC ....... 324/764.01; 324/323; 324/365; 320/106
(58) Field of Classification Search
USPC .............. 324/764.01, 323, 365; 320/106
See application file for complete search history.

(56) References Cited

U.S. PATENT DOCUMENTS

| 4,140,957 | A | * | 2/1979 | Rapp | 320/106 |
|---|---|---|---|---|---|
| 5,622,789 | A | * | 4/1997 | Young | 429/7 |
| 6,452,362 | B1 | * | 9/2002 | Choo | 320/116 |
| 7,555,500 | B2 | * | 6/2009 | Pederson et al. | 1/1 |
| 2002/0053456 | A1 | * | 5/2002 | Nishida | 174/70 B |
| 2011/0206948 | A1 | * | 8/2011 | Asai et al. | 429/7 |
| 2012/0129036 | A1 | * | 5/2012 | Watanabe et al. | 429/151 |
| 2013/0063094 | A1 | * | 3/2013 | Gibbs et al. | 320/134 |

FOREIGN PATENT DOCUMENTS

| JP | 06-275341 | A | | 9/1994 |
|---|---|---|---|---|
| JP | 10-210683 | A | | 8/1998 |
| JP | 20002-117821 | | * | 4/2000 |
| JP | 2002-117821 | A | | 4/2002 |
| JP | 2004-007919 | | * | 5/2002 |
| JP | 2005-085691 | A | | 3/2005 |
| JP | 2005-238969 | A | | 9/2005 |
| JP | 2006-324350 | A | | 11/2006 |

* cited by examiner

*Primary Examiner* — Arleen M Vazquez
*Assistant Examiner* — Giovanni Astacio-Oquendo
(74) *Attorney, Agent, or Firm* — Sughrue Mion, PLLC

(57) ABSTRACT

A diagnostic apparatus for erroneous installation of power storage stacks includes a first connector portion included in a first power storage stack, a second connector portion included in a second power storage stack capable of connection to the first power storage stack, and a third connector portion included in a third power storage stack which should be prohibited from connection to the first power storage stack, wherein the first connector portion and the second connector portion provides a first circuit when they are connected to each other, and the first connector portion and the third connector portion provides a second circuit when they are connected to each other, the second circuit having a different circuit configuration from that of the first circuit.

8 Claims, 11 Drawing Sheets

TO MONITOR UNIT

FIG. 10

| COMBINATION NO | STACK IN UPPER STAGE | STACK IN LOWER STAGE | TERMINAL A-B | TERMINAL C-D | DETERMINATION | TYPE OF STACK |
|---|---|---|---|---|---|---|
| CASE 1 | FIRST POWER STORAGE STACK | SECOND POWER STORAGE STACK | OPEN | OPEN | CORRECT INSTALLATION | STACK MADE BY COMPANY A |
| CASE 2 | FIRST POWER STORAGE STACK | THIRD POWER STORAGE STACK | OPEN | CLOSED | ERRONEOUS INSTALLATION | |
| CASE 3 | FOURTH POWER STORAGE STACK | SECOND POWER STORAGE STACK | CLOSED | OPEN | ERRONEOUS INSTALLATION | |
| CASE 4 | FOURTH POWER STORAGE STACK | THIRD POWER STORAGE STACK | CLOSED | CLOSED | CORRECT INSTALLATION | STACK MADE BY COMPANY B |

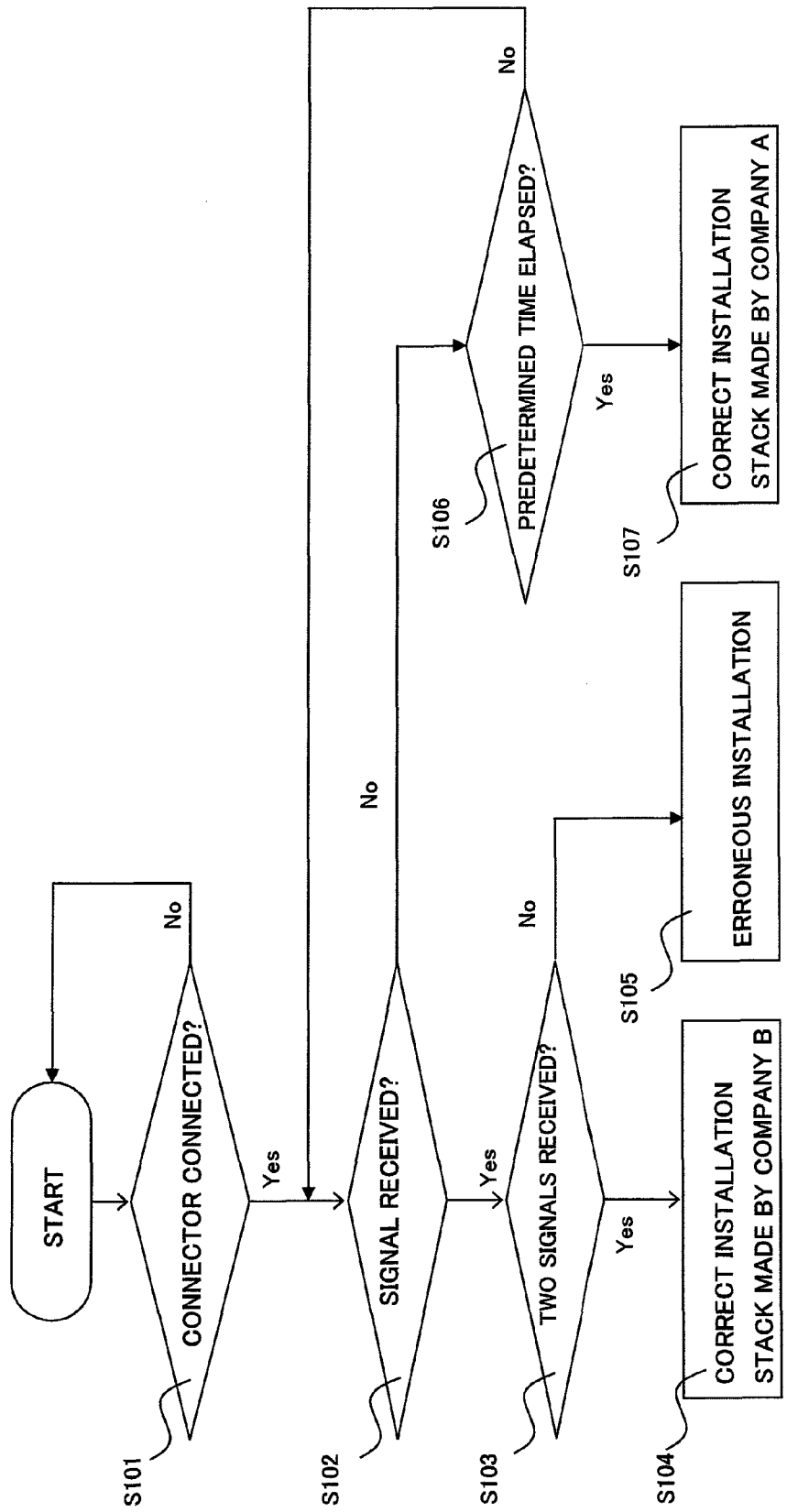

FIG. 18

| | STACK IN UPPER STAGE | STACK IN LOWER STAGE | TERMINAL A-B | TERMINAL C-D | DETERMINATION | TYPE OF STACK |
|---|---|---|---|---|---|---|
| CASE 1 | FIRST POWER STORAGE STACK | SECOND POWER STORAGE STACK | OPEN | OPEN | CORRECT INSTALLATION | STACK MADE BY COMPANY A |
| CASE 2 | FIRST POWER STORAGE STACK | THIRD POWER STORAGE STACK | | | CONNECTORS ARE DIFFERENT AND NOT INSTALLED MUTUALLY | |
| CASE 3 | FOURTH POWER STORAGE STACK | SECOND POWER STORAGE STACK | | | | |
| CASE 4 | FOURTH POWER STORAGE STACK | THIRD POWER STORAGE STACK | CLOSED | CLOSED | CORRECT INSTALLATION | STACK MADE BY COMPANY B |

# DIAGNOSTIC APPARATUS FOR ERRONEOUS INSTALLATION OF POWER STORAGE STACKS AND VEHICLE

CROSS REFERENCE TO RELATED APPLICATIONS

This application is a National Stage of International Application No. PCT/JP2011/000798 filed Feb. 14, 2011, the contents of all of which are incorporated herein by reference in their entirety.

TECHNICAL FIELD

The present invention relates to a diagnostic apparatus and the like for diagnosing erroneous installation of power storage stacks which are prohibited from connection to each other.

BACKGROUND ART

A power storage apparatus provided by connecting a plurality of power storage stacks each including a plurality of power storage elements connected to each other is known as a battery for vehicle.

PRIOR ART DOCUMENTS

Patent Document

[Patent Document 1] Japanese Patent Laid-Open No. 2005-238969

DISCLOSURE OF THE INVENTION

Problems to be Solved by the Invention

The connection of the power storage stacks to each other, however, should be prohibited in some cases. For example, when power storage elements constituting one power storage stack have different open circuit voltages from those of power storage elements constituting the other power storage stack, the connection of these power storage stacks reduces the estimation accuracy of SOC (State Of Charge), so that charge may be performed in a situation in which the charge should be prohibited or discharge may be performed in a situation in which the discharge should be prohibited.

In other words, the open circuit voltage and the SOC have a correlation, and there is a known method of estimating the SOC based on the measurement of the open circuit voltage. In estimating the SOC with the method, the estimation accuracy of the SOC is reduced if the power storage elements having different open-end voltages are included.

It is thus an object of the present invention to provide a diagnostic apparatus capable of sensing the connection of power storage stacks which should be prohibited from connection.

Means for Solving the Problems

To solve the abovementioned problem, the present invention provides a diagnostic apparatus for erroneous installation of power storage stacks including a first connector portion included in a first power storage stack, a second connector portion included in a second power storage stack capable of connection to the first power storage stack, and a third connector portion included in a third power storage stack which should be prohibited from connection to the first power storage stack, wherein the first connector portion and the second connector portion provides a first circuit when they are connected to each other, and the first connector portion and the third connector portion provides a second circuit when they are connected to each other, the second circuit having a different circuit configuration from that of the first circuit.

(2) In the configuration in (1) described above, the first power storage stack includes a plurality of first power storage elements, the second power storage stack includes a plurality of second power storage elements, the third power storage stack includes a plurality of third power storage elements, the first power storage element and the second power storage element have the same open circuit voltage, and the first power storage element and the third power storage element has different open circuit voltages. According to the configuration in (2), it is possible to prevent the connection of the power storage stacks including the power storage elements having the different open circuit voltages. This can suppress a reduction in the estimation accuracy of SOC.

(3) In the configuration in (1) or (2) described above, the first circuit and the second circuit have different open/close structures of the circuits. According to the configuration in (3), it is possible to determine easily whether or not erroneous installation occurs on the basis of whether the circuit is an open circuit or a closed circuit.

(4) In the configuration in (1) to (3) described above, the first connector portion is provided for a first bus bar module included in the first power storage stack, the second connector portion is provided for a second bus bar module included in the second power storage stack, and the third connector portion is provided for a third bus bar module included in the third power storage stack. According to the configuration in (4), the connector portion and the bus bar module can be combined in one unit. This allows the determination of erroneous installation with the simple configuration.

(5) In the configuration in (1) to (4) described above, a monitor unit determining whether or not erroneous installation occurs based on output states of the first circuit and the second circuit is provided. According to the configuration in (5), the erroneous installation can be determined by the monitor unit.

(6) In the configuration in (5) described above, the first connector portion includes a first temperature information transmission line transmitting temperature information taken from the first power storage stack, the second connector portion includes a second temperature information transmission line transmitting temperature information taken from the second power storage stack, and the monitor unit takes the temperature information transmitted through the first temperature information transmission line and the second temperature information transmission line in a connection state in which the first connector portion and the second connector portion are connected to each other. According to the configuration in (6), the monitor unit taking the temperature information performs the determination processing of erroneous installation, so that the configuration can be simplified.

(7) In the configuration in (1) to (6) described above, a fourth connector portion included in a fourth power storage stack capable of connection to the third power storage stack is provided. The second connector portion and the fourth connector portion provides a third circuit when they are connected to each other, the third circuit having a different circuit configuration from those of the first circuit and the second circuit. The third connector portion and the fourth connector portion provides a fourth circuit when they are connected to each other, the fourth circuit having a different circuit configuration from those of the first circuit, the second circuit, and the third circuit. According to the configuration in (7), in addition to the determination of erroneous installation, the types of the power storage stacks correctly installed mutually can be specified.

(8) In the configuration in (1) to (7) described above, the first and second power storage stacks are placed in two stages one on another vertically in a connection state in which the first and second connector portions are connected to each other.

(9) The diagnostic apparatus in (1) to (8) described above can be mounted on a vehicle. The vehicle may be an electric car or a hybrid car in which both of a power storage apparatus and an internal combustion engine are used as a power source.

Effect of the Invention

According to the present invention, it is possible to prevent the connection of power storage stacks which should be prohibited from connection.

BRIEF DESCRIPTION OF THE DRAWINGS

FIG. 10 is a data table showing signals output from the connector portions, the determination results of erroneous installation, and the types of the stacks, in association with each other.

FIG. 11 is a flow chart showing a diagnostic method performed by a diagnostic apparatus.

FIG. 18 is a data table showing signals output from the connector portions, the determination results of erroneous installation, and the types of the stacks, in association with each other.

BEST MODE FOR CARRYING OUT THE INVENTION

Figure 1:
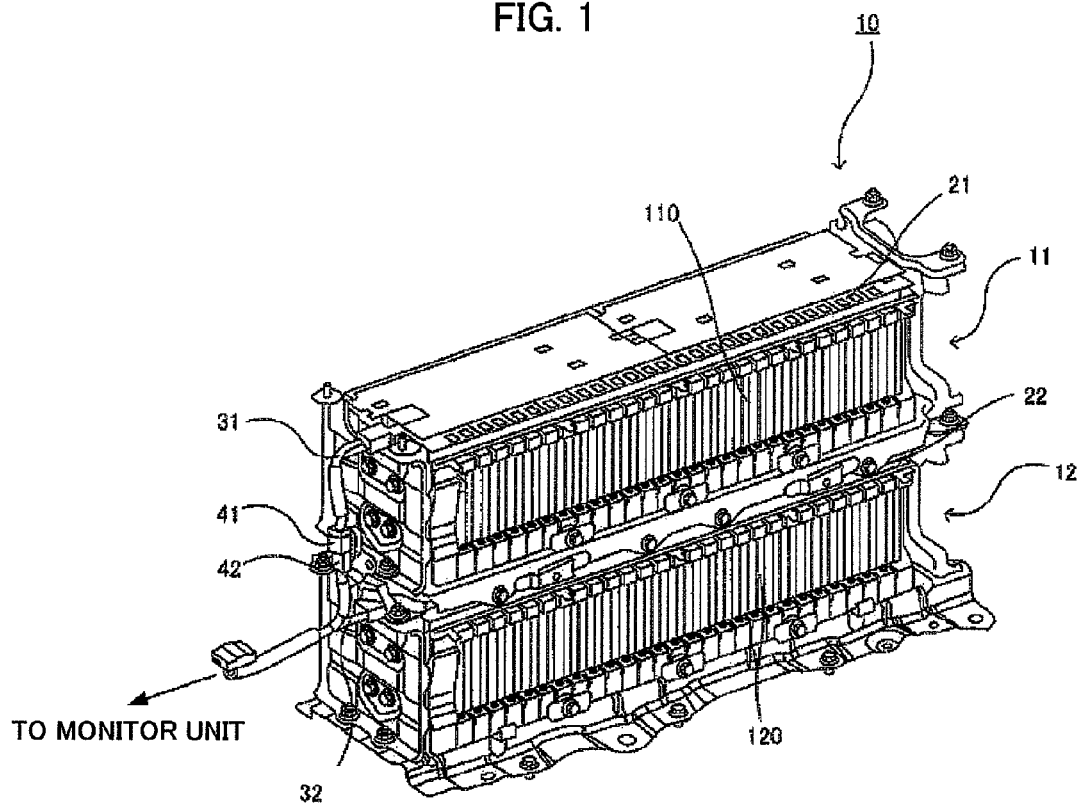
FIG. 1 is a perspective view of a power storage apparatus.

Referring to FIG. 1, description will be made of a power storage apparatus for which the presence or absence of erroneous installation is determined by a diagnostic apparatus according to the present invention. FIG. 1 is a perspective view of the power storage apparatus. The power storage apparatus 10 includes a first power storage stack 11 and a second power storage stack 12. The first power storage stack 11 and the second power storage stack 12 are placed one on another vertically. The power storage apparatus 10 is mounted on a vehicle.

The first power storage stack 11 includes a plurality of first power storage elements 110 which are connected serially through bus bars, not shown. A first bus bar module 21 combines these bus bars in one unit. When the first bus bar module 21 is placed on upper faces of the first power storage elements 110, each of the bus bars installed on the first bus bar module 21 is electrically and mechanically connected to a terminal electrode of each of the first power storage elements 110.

The second power storage stack 12 includes a plurality of second power storage elements 120 which are connected serially through bus bars, not shown. A second bus bar module 22 combines these bus bars in one unit. When the second bus bar module 22 is placed on upper faces of the second power storage elements 120, each of the bus bars installed on the second bus bar module 22 is electrically and mechanically connected to a terminal electrode of each of the second power storage elements 120.

The first power storage element 110 and the second power storage element 120 have the same open circuit voltage. The open circuit voltage refers to the voltage value between terminals in a state in which the power storage element is not connected to any equipment (a state in which no electric current passes). The first power storage element 110 and the second power storage element 120 may be a lithium-ion battery or a nickel metal hydride battery.

The first bus bar module 21 has a first temperature information transmission line 31 which extends from a thermistor, not shown, for taking the temperature information of the first power storage element 110. The first temperature information transmission line 31 is connected to a first connector portion 41. The second bus bar module 22 has a second temperature information transmission line 32 which extends from a thermistor, not shown, for taking the temperature information of the second power storage element 120. The second temperature information transmission line 32 is connected to a second connector portion 42.

Figure 2:
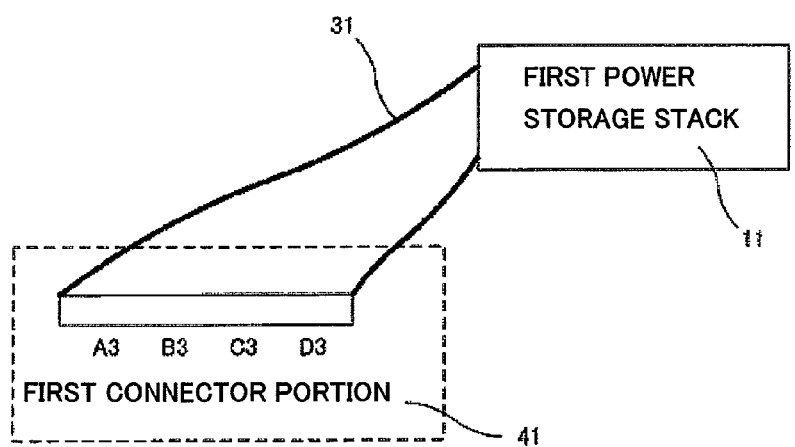
FIG. 2 is a circuit diagram of a first connector portion included in a first power storage stack.
Figure 3:
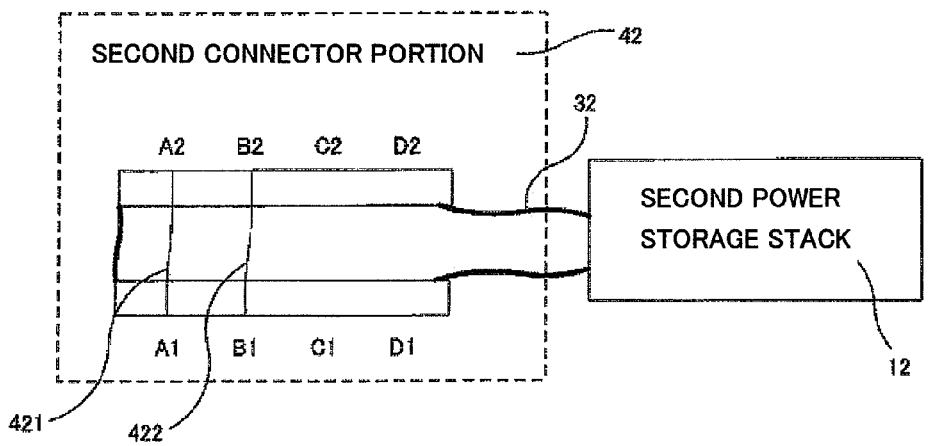
FIG. 3 is a circuit diagram of a second connector portion included in a second power storage stack.
Figure 4:
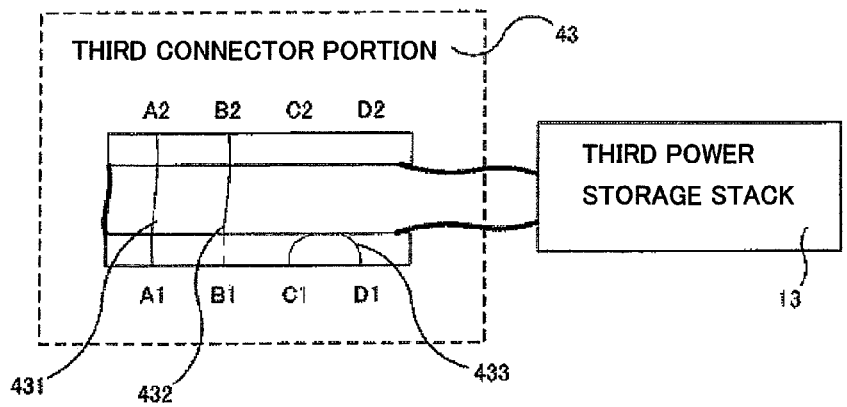
FIG. 4 is a circuit diagram of a third connector portion included in a third power storage stack.
Figure 5:
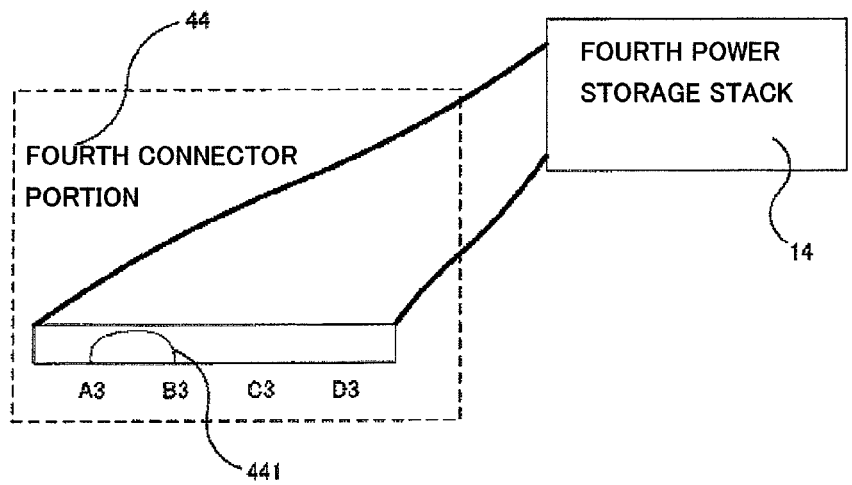
FIG. 5 is a circuit diagram of a fourth connector portion included in a fourth power storage stack.

Next, the connector portion will be described in detail with reference to FIG. 2 to FIG. 5. FIG. 2 is a circuit diagram of the first connector portion 41 provided for the first power storage stack 11. FIG. 3 is a circuit diagram of the second connector portion 42 provided for the second power storage stack 12. FIG. 4 is a circuit diagram of a third connector portion 43 provided for a third power storage stack 13. FIG. 5 is a circuit diagram of a fourth connector portion 44 provided for a fourth power storage stack 14.

The third power storage stack 13 is formed by connecting a plurality of power storage elements (third power storage elements), and each of these power storage elements have different open circuit voltages from those of the first power storage elements 110. The fourth power storage stack 14 is formed by connecting a plurality of power storage elements, and these power storage elements have the same open circuit voltage as that of the power storage elements constituting the third power storage stack 13.

As described above, when the power storage stacks including the power storage elements having the different open circuit voltages from each other are connected, the estimation accuracy of the SOC is reduced. Thus, the third power storage stack 13 and the fourth power storage stack 14 are prohibited from connection to the first power storage stack 11 and to the second power storage stack 12. In the following description, the first power storage stack 11 and the second power storage stack 12 may be referred to as power storage stacks made by company A, and the third power storage stack 13 and the fourth power storage stack 14 may be referred to as power storage stacks made by company B.

Referring to FIG. 2, the first connector portion 41 includes four different terminals referred to as A3, B3, C3, and D3, and the terminals A3, B3, C3, and D3 are not connected to each other. Referring to FIG. 3, the second connector portion 42 includes eight different terminals referred to as A1, A2, B1, B2, C1, C2, D1, and D2. The terminal A1 and the terminal A2 are electrically connected to each other through a conductor 421. The terminal B1 and the terminal B2 are electrically connected to each other through a conductor 422. The terminal C1, the terminal C2, the terminal D1, and the terminal D2 are not connected to any conductor.

Referring to FIG. 4, the third connector portion 43 includes eight different terminals referred to as A1, A2, B1, B2, C1, C2, D1, and D2. The terminal A1 and the terminal A2 are electrically connected to each other through a conductor 431. The terminal B1 and the terminal B2 are electrically connected to each other through a conductor 432. The terminal C1 and the terminal D1 are electrically connected to each other through a conductor 433. The terminal C2 and the terminal D2 are not connected to any conductor. Referring to FIG. 5, the fourth connector portion 44 includes four different terminals referred to as A3, B3, C3, and D3. The terminal A3 and the terminal B3 are electrically connected to each other through a conductor 441. The terminal C3 and the terminal D3 are not connected to any conductor.

Figure 6:
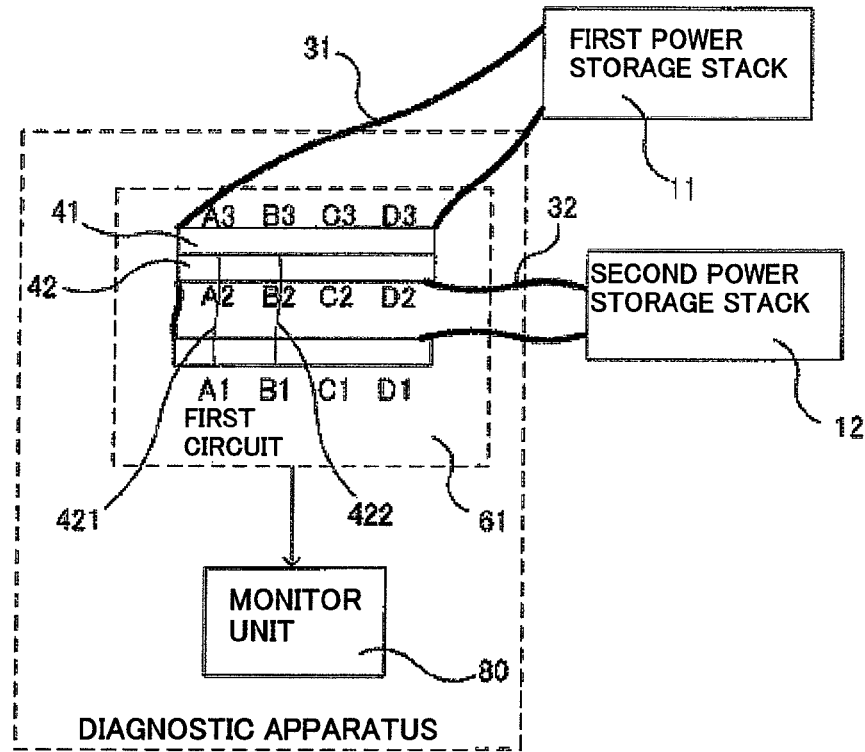
FIG. 6 is a circuit diagram of a first circuit formed by connecting the first connector portion and the second connector portion (case 1).
Figure 7:
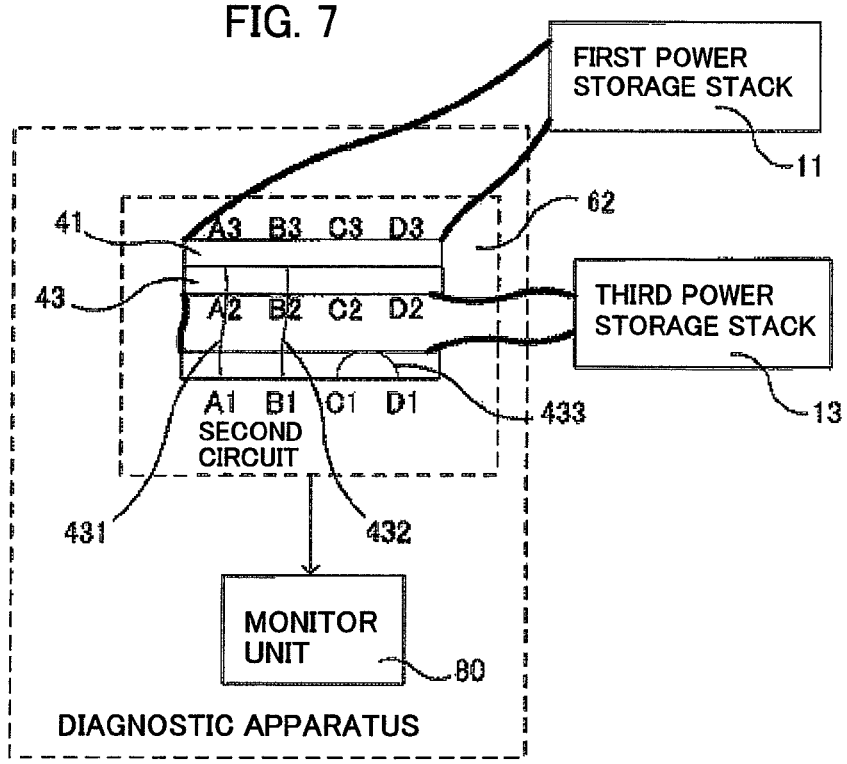
FIG. 7 is a circuit diagram of a second circuit formed by connecting the first connector portion and the third connector portion (case 2).
Figure 8:
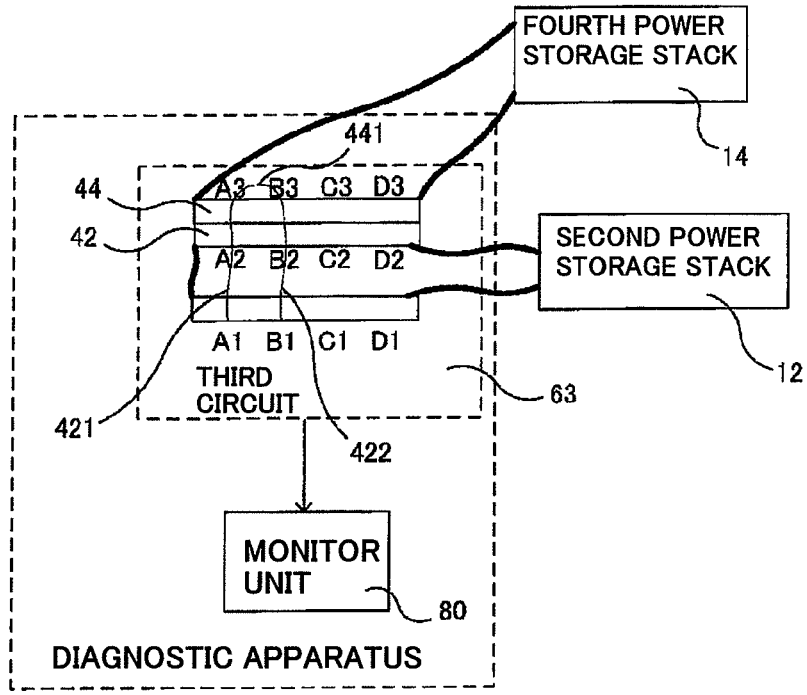
FIG. 8 is a circuit diagram of a third circuit formed by connecting the fourth connector portion and the second connector portion (case 3).
Figure 9:
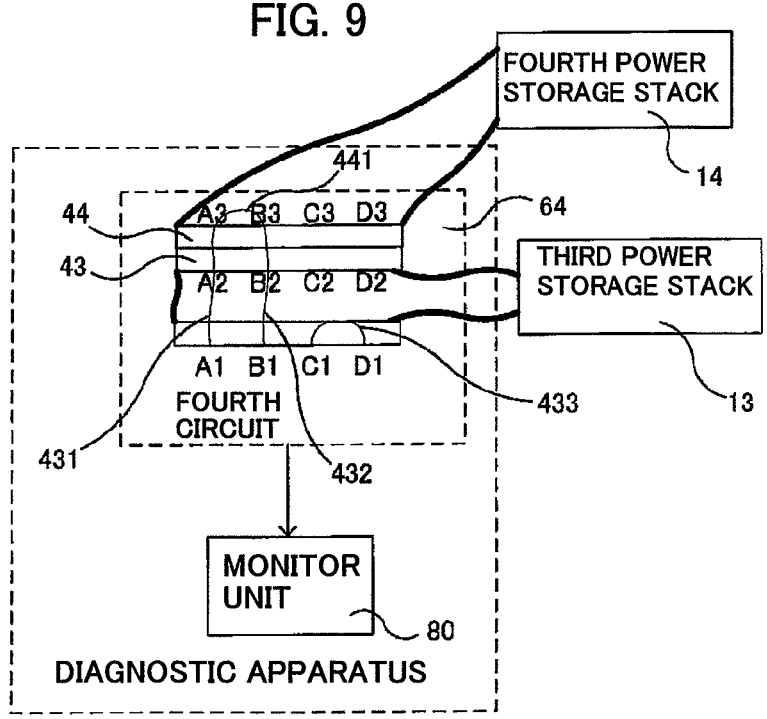
FIG. 9 is a circuit diagram of a fourth circuit formed by connecting the fourth connector portion and the third connector portion (case 4).

Next, the configuration of the diagnostic apparatus will be described with reference to FIG. 6 to FIG. 10. FIG. 6 is a block diagram of the diagnostic apparatus including a first circuit (case 1) formed by connecting the first connector portion 41 and the second connector portion 42. FIG. 7 is a block diagram of the diagnostic apparatus including a second circuit (case 2) formed by connecting the first connector portion 41 and the third connector portion 43. FIG. 8 is a block diagram of the diagnostic apparatus including a third circuit (case 3) formed by connecting the fourth connector portion 44 and the second connector portion 42. FIG. 9 is a block diagram of the diagnostic apparatus including a fourth circuit (case 4) formed by connecting the fourth connector portion 44 and the third connector portion 43. FIG. 10 is a data table which shows signals output from the connector portions, the determination results of erroneous installation, and the types of the stacks, in association with each other.

The first power storage stack 11 and the fourth power storage stack 14 are placed in an upper stage of the power storage apparatus 10. The second power storage stack 12 and the third power storage stack 13 are placed in a lower stage of the power storage apparatus 10.

Referring to FIG. 6, the first circuit 61 is connected to a monitor unit 80. The monitor unit 80 can monitor signals output from the terminal A1 and the terminal B1. The monitor unit 80 can monitor signals output from the terminal C1 and the terminal D1. The terminal A1 and the terminal B1 are not connected through any conductor, that is, they provide an open circuit. The terminal C1 and the terminal D1 are not connected through any conductor, that is, they provide an open circuit. Thus, the first circuit 61 does not output any signal to the monitor unit 80.

Referring to FIG. 7, the second circuit 62 is connected to the monitor unit 80. The monitor unit 80 can monitor signals output from the terminal A1 and the terminal B1. The monitor unit 80 can monitor signals output from the terminal C1 and the terminal D1. The terminal A1 and the terminal B1 are not connected through any conductor, that is, they provide an open circuit. The terminal C1 and the terminal D1 are connected through the conductor 433, that is, they provide a closed circuit. Thus, a signal is output from each of the terminal C1 and the terminal D1 in the second circuit 62 to the monitor unit 80.

Referring to FIG. 8, the third circuit 63 is connected to the monitor unit 80. The monitor unit 80 can monitor signals output from the terminal A1 and the terminal B1. The monitor unit 80 can monitor signals output from the terminal C1 and the terminal D1. The terminal A1 and the terminal B1 are connected through the conductor 421, the conductor 441, and the conductor 422, that is, they provide a closed circuit. The terminal C1 and the terminal D1 are not connected through any conductor, that is, they provide an open circuit. Thus, a signal is output from each of the terminal A1 and the terminal E1 in the third circuit 63 to the monitor unit 80.

Referring to FIG. 9, the fourth circuit 64 is connected to the monitor unit 80. The monitor unit 80 can monitor signals output from the terminal A1 and the terminal B1. The monitor unit 80 can monitor signals output from the terminal C1 and the terminal D1. The terminal A1 and the terminal B1 are connected through the conductor 431, the conductor 441, and the conductor 432, that is, they provide a closed circuit. The terminal C1 and the terminal D1 are connected through the conductor 433, that is, they provide a closed circuit. Thus, a signal is output from each of the terminal A1, the terminal B1, the terminal C1, and the terminal D1 in the fourth circuit 64 to the monitor unit 80.

The monitor unit 80 references the data table in FIG. 10 based on the output states of the first circuit 61, the second circuit 62, the third circuit 63, and the fourth circuit 64 to determine whether erroneous installation occurs or not, and specifies the type of the stack when erroneous installation does not occur. In the present embodiment, the monitor unit 80 is determined that the installation is correct in the case 1 and that the stacks are of the type made by company A. The monitor unit 80 is determined that the installation is erroneous in the case 2. The monitor unit 80 is determined that the installation is erroneous in the case 3. The monitor unit 80 is determined that the installation is correct in the case 4 and that the stacks are of the type made by company B.

The monitor unit 80 includes a CPU or an MPU which makes the determination. However, at least part of the processing realized in the CPU or the MPU may be performed with circuit by an ASIC circuit. When the erroneous installation occurs, the monitor unit 80 may prohibit the use of the power storage apparatus 10.

The first connector portion 41 and the second connector portion 42 are connected to transmit the temperature information of the first power storage stack 11 and the second power storage stack 12 to the monitor unit 80 through the first temperature information transmission line 31 and the second temperature information transmission line 32, respectively. In this manner, the circuit for determining the erroneous installation can be implemented in the first connector portion 41 and the second connector portion 42 for connecting the temperature information transmission line for taking the temperature information of the first power storage stack 11 and the second power storage stack 12 to the monitor unit 80, thereby achieving a reduction in cost.

Next, the operation of the diagnostic apparatus will be described with reference to a flow chart in FIG. 11. At step S101, the monitor unit 80 determines whether or not the connector is connected. The monitor unit 80 senses the connection of the connector by sensing the leading edge (the signal level changing from L level to H level) of D+signal or D−signal.

At step S102, the monitor unit 80 determines whether or not it receives a determination signal for determining whether or not the erroneous installation occurs from the circuit of the connector. When the determination signal is received at step S102, the processing proceeds to step S103, or to step S106 when the determination signal is not received.

At step S103, the monitor unit 80 determines whether or not it receives two signals from the circuit of the connector, that is, signals output from the closed circuit including the terminal A1 and the terminal B1 and from the closed circuit including the terminal C1 and the terminal D1. When the two signals are received, the processing proceeds to step S104. When the two signals are not received, that is, when only one signal is received from one of the closed circuits, the processing proceeds to step S105.

At step S104, the monitor unit 80 references the data table in FIG. 10 to determine that the power storage stacks made by B company are correctly installed. At step S105, the monitor unit 80 references the data table in FIG. 10 to determine that the power storage stacks are erroneously installed.

At step S106, the monitor unit 80 determines whether or not a predetermined time period has elapsed on the basis of the result of count of a timer, not shown. The timer may be mounted within the monitor unit 80 or mounted externally. It is only required that the predetermined time period should be set to a length in which the signal output from the circuit of the connector can be received. When the predetermined time period has elapsed at step S106, the processing proceeds to step S107.

At step S107, the monitor unit 80 references the data table in FIG. 10 to determine that the power storage stacks made by company A are correctly installed.

According to the abovementioned configuration, it is possible to determine whether or not the power storage stacks mounted on the vehicle are erroneously installed when the power storage stacks are replaced. This can achieve the uniform open circuit voltages of the power storage elements included in the power storage apparatus 10 to suppress a reduction in the estimation accuracy of the SOC. In the case of the erroneous installation, the monitor unit 80 may prohibit the use of the power storage apparatus 10.

(Modification 1)

Figure 12:
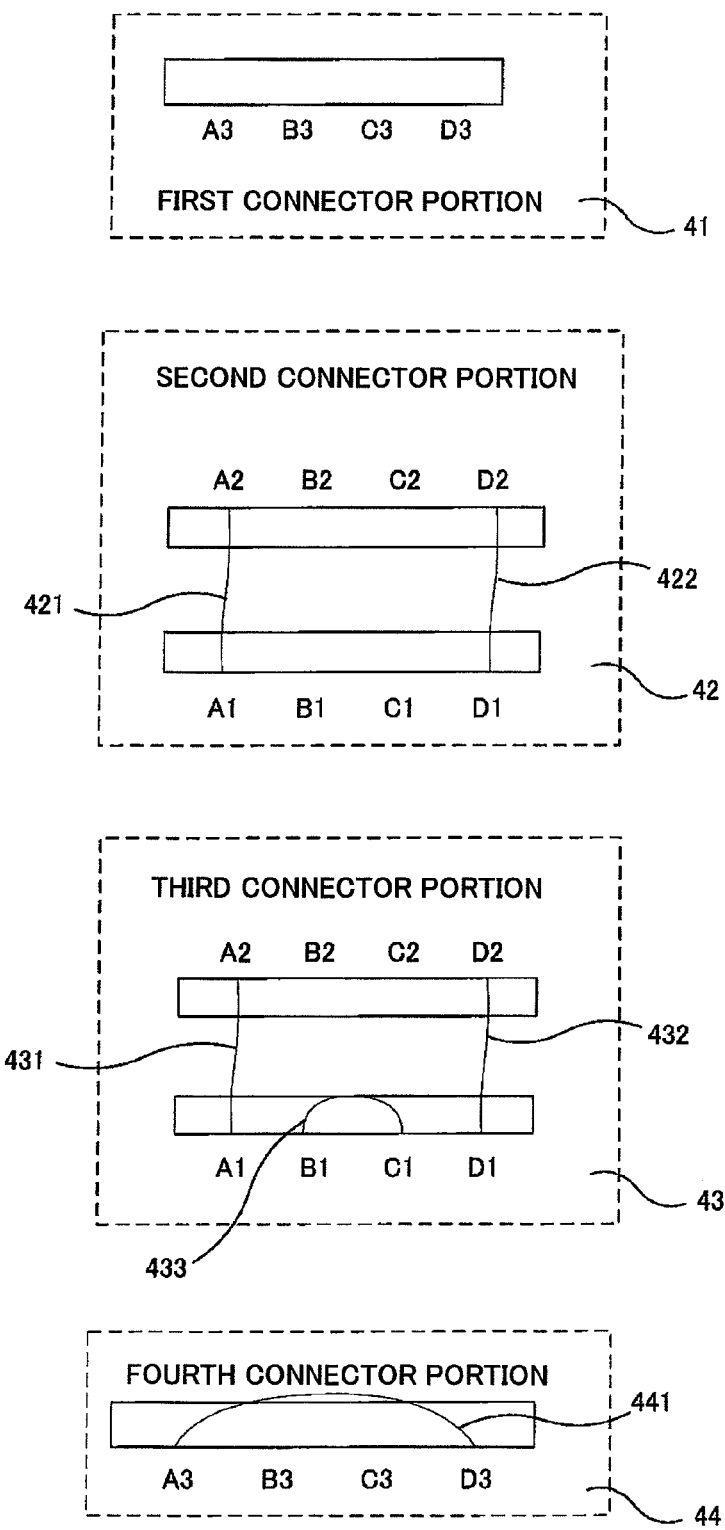
FIG. 12 is a circuit diagram of a connector portion in Modification 1.

While the erroneous installation is determined in the embodiment described above based on the open/close structures of the circuits including the terminal A1 and the terminal B1 and the open/close structures of the circuits including the terminal C1 and the terminal D1, another method may be used. For example, as shown in FIG. 12, it is possible to use the first connector portion 41 having the same structure as that in the abovementioned embodiment, to use the second connector portion 42 in which the conductor 422 is changed to connect the terminal D1 and the terminal D2, to use the third connector portion 43 in which the conductor 432 is changed to connect the terminal D1 and the terminal D2, and to use the fourth connector portion 44 in which the conductor 441 is changed to connect the terminal A3 and the terminal D3. This configuration can also be used to determine whether or not erroneous installation occurs.

When the first connector portion 41 and the second connector portion 42 are connected, no signal is output from the first circuit 61. When the first connector portion 41 and the third connector portion 43 are connected, a signal is output from each of the terminals B1 and C1 in the second circuit 62. When the fourth connector portion 44 and the second connector portion 42 are connected, a signal is output from each of the terminals A1 and D1 in the third circuit 63. When the fourth connector portion 44 and the third connector portion 43 are connected, a signal is output from each of the terminals A1, D1, B1, and C1 in the fourth circuit 64. Thus, the monitor unit 80 can determine whether or not the erroneous installation occurs by monitoring the output states of the first circuit 61, the second circuit 62, the third circuit 63, and the fourth circuit 64.

(Modification 2)

Figure 13:
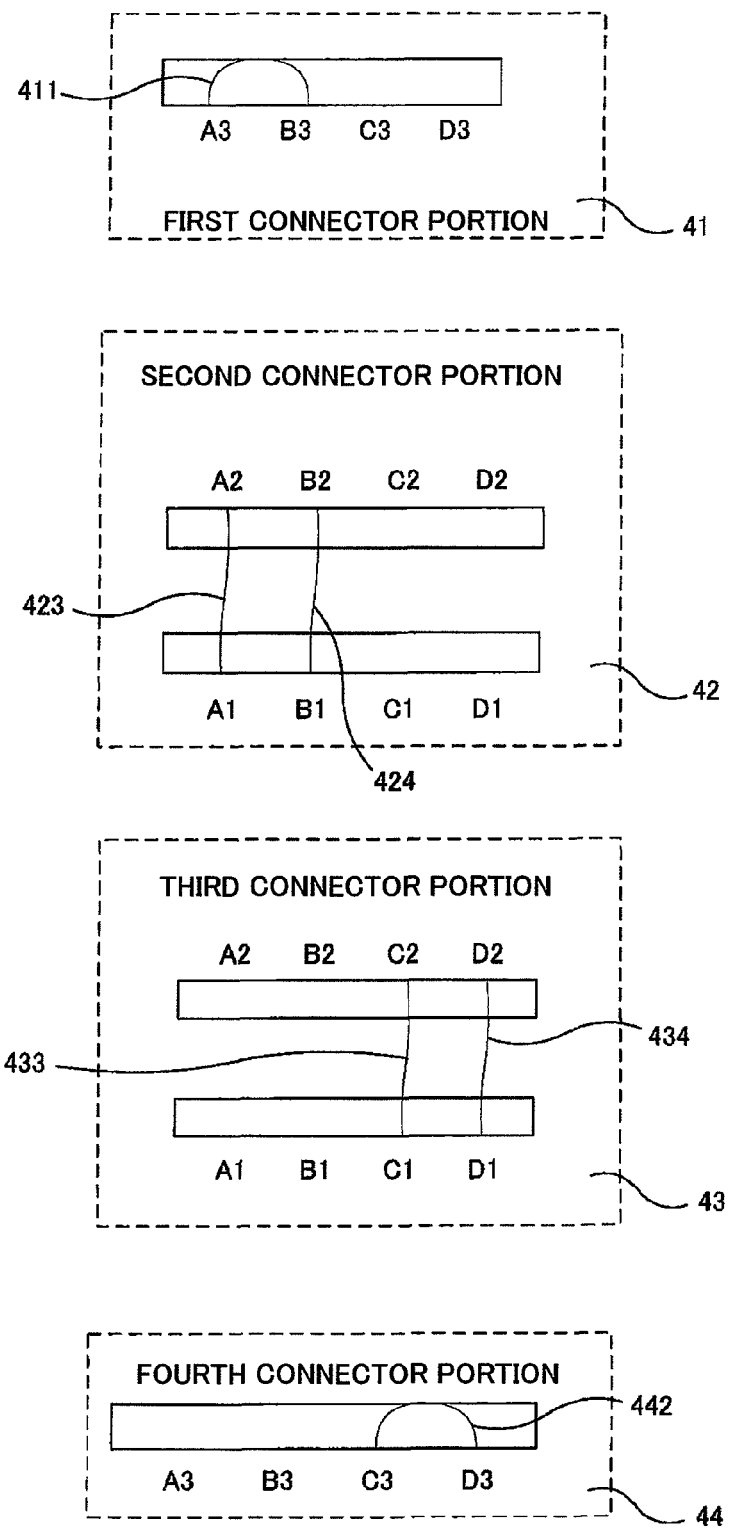
FIG. 13 is a circuit diagram of a connector portion in Modification 2.

In addition, the first connector portion 41, the second connector portion 42, the third connector portion 43, and the fourth connector portion 44 may have the following configurations. FIG. 13 is a circuit diagram of the connector portions 41 to 44. In the first connector portion 41, the terminal A3 and the terminal B3 are connected through a conductor 411. In the second connector portion 42, the terminal A1 and the terminal A2 are connected through a conductor 423, and the terminal B1 and the terminal B2 are connected through a conductor 424. In the third connector portion 43, the terminal C1 and the terminal C2 are connected through the conductor 433, and the terminal D1 and the terminal D2 are connected through a conductor 434. In the fourth connector portion 44, the terminal C3 and the terminal D3 are connected through a conductor 442.

When the first connector portion 41 and the second connector portion 42 are connected, a signal is output from each of the terminal A1 and the terminal B1 in the first circuit 61. When the first connector portion 41 and the third connector portion 43 are connected, any signal is not output from the second circuit 62. When the fourth connector portion 44 and the second connector portion 42 are connected, any signal is not output from the third circuit 63. When the fourth connector portion 44 and the third connector portion 43 are connected, a signal is output from each of the terminal C1 and the terminal D1 in the fourth circuit 64. Thus, the monitor unit 80 can determine whether or not erroneous installation occurs by monitoring the output states of the first circuit 61, the second circuit 62, the third circuit 63, and the fourth circuit 64.

As described in Modifications 1 and 2, the determination circuit for determining whether or not the erroneous installation occurs has various aspects, and any configuration may be employed as long as the determination can be made. Consequently, the configuration of the determination circuit is not limited to the description in the present specification.

(Modification 3)

While the diagnostic apparatus is mounted on the vehicle in the above embodiment, the present invention is not limited thereto and another configuration may be used. In the other configuration, the diagnostic apparatus may be provided in a test step prior to the shipment of the power storage apparatus. Typically, the power storage stack to be tested in the test step has a label or the like affixed thereto for specifying the type of the stack, and from the information provided on the label, the type of the power stack can be determined. However, the same label may be affixed to the power storage stacks of different types due to errors in affixation of the label, errors in reading of the label or the like. According to the present modification, the erroneous installation of the power storage stack can be determined in the test step. In this case, a controller responsible for control of the entire test step may be used instead of the monitor unit 80. The controller may be a CPU or an MPU. However, at least part of the processing realized by the CPU or the MPU may be performed with circuit by an ASIC circuit.

(Modification 4)

While the different open circuit voltages are used as the reason for prohibiting the connection of the power storage stacks in the abovementioned embodiment, the present invention is not limited thereto, and the connection may be prohibited on the basis of another criterion. The other criterion may be whether or not power storage stacks have different battery capacities from each other. For example, when the first power storage element 110 and the power storage element constituting the third power storage stack 13 have different battery capacities from each other, the connection of the first power storage stack 11 and the power storage stack 13 is prohibited, and the configuration of the above embodiment can be used as means for prohibiting this connection.

Reference Example

Figure 14:
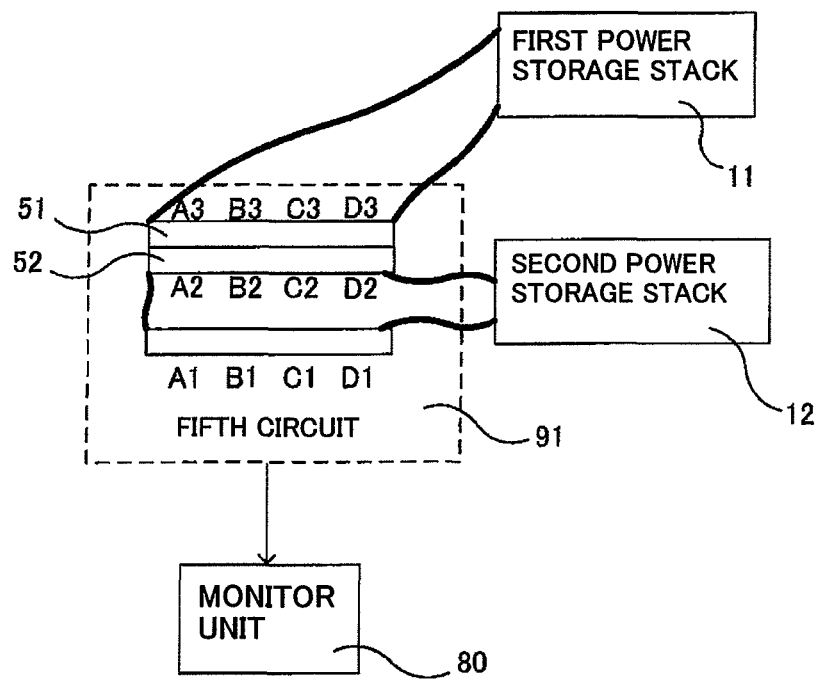
FIG. 14 is a circuit diagram of a fifth circuit formed by connecting a fifth connector portion and a sixth connector portion (case 1).
Figure 15:
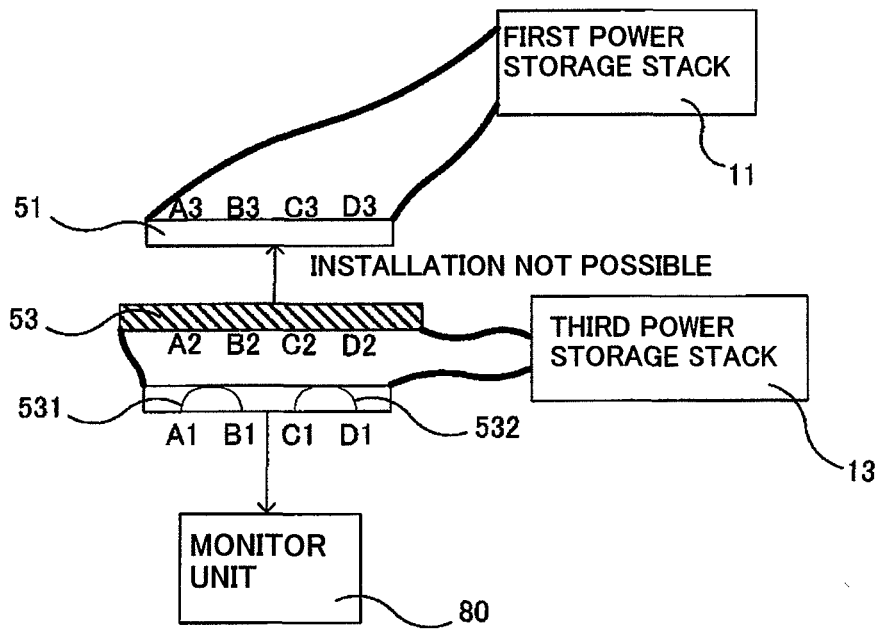
FIG. 15 is a diagram showing that the connection of the fifth connector portion and a seventh connector portion is mechanically prohibited (case 2).
Figure 16:
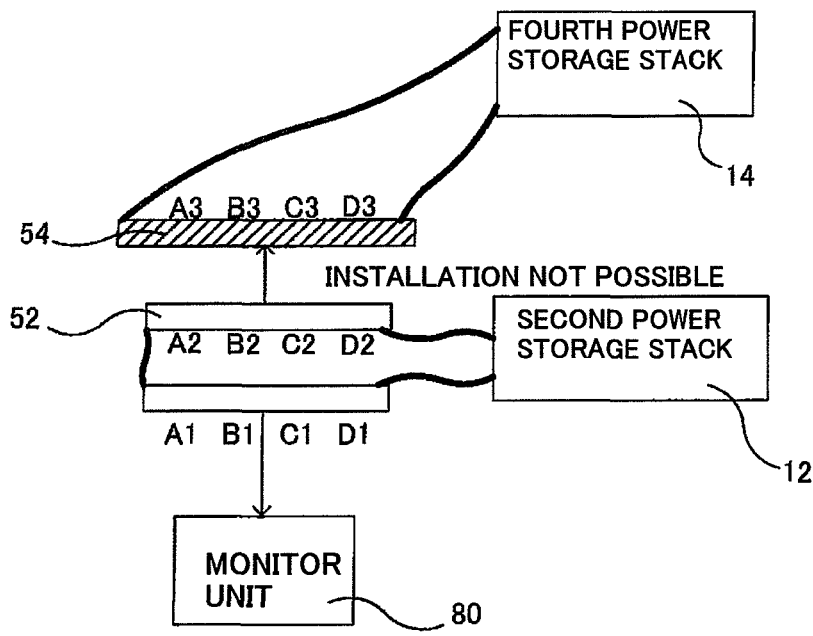
FIG. 16 is a circuit diagram of a sixth circuit formed by connecting an eighth connector portion and the sixth connector portion (case 3).
Figure 17:
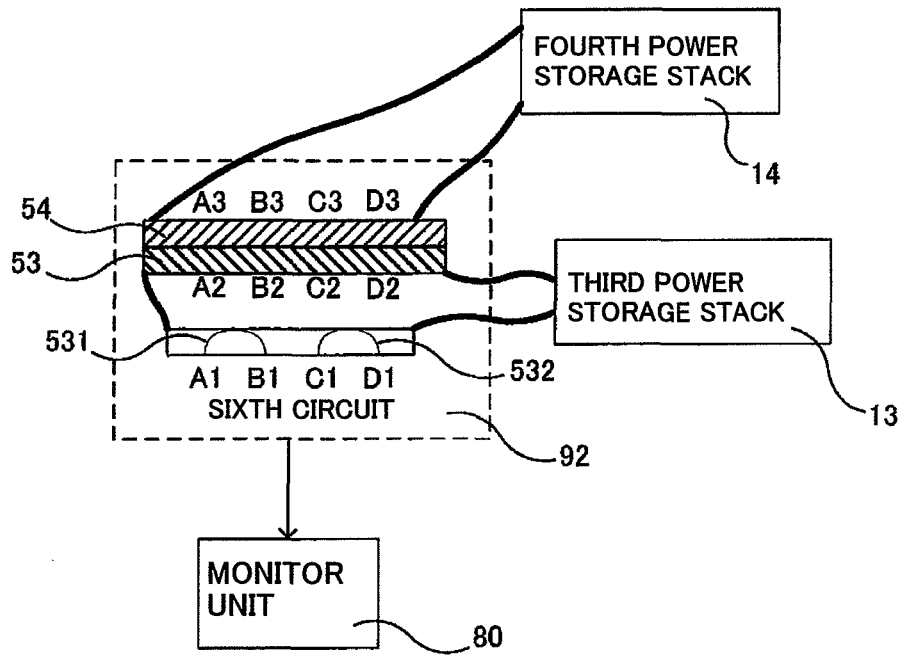
FIG. 17 is a conceptual diagram showing that the connection of the eighth connector portion and the seventh connector portion is mechanically prohibited (case 4).

A reference example of the present embodiment will be described. In the present reference example, erroneous installation is prevented by prohibiting the mechanical connection of connectors. FIG. 14 is a circuit diagram of a fifth circuit (case 1) formed by connecting a fifth connector portion and a sixth connector portion. FIG. 15 is a diagram (case 2) showing that the connection of the fifth connector portion and a seventh connector portion is mechanically prohibited. FIG. 16 is a circuit diagram of a sixth circuit (case 3) formed by connecting an eighth connector portion and the sixth connector portion. FIG. 17 is a diagram (case 4) showing that the connection of the eighth connector portion and the seventh connector portion is mechanically prohibited. FIG. 18 is a data table which shows signals output from the connector portions, the determination results of erroneous installation, and the types of the stacks, in association with each other.

Referring to these figures, the first power storage stack 11 includes the fifth connector portion 51, the second power storage stack 12 includes the sixth connector portion 52, the third power storage stack 13 includes the seventh connector portion 53, and the fourth power storage stack 14 includes the eighth connector portion 54. The fifth connector portion 51 and the sixth connector portion 52 are formed to have shapes mechanically connectable to each other, and the eighth connector portion 54 and the seventh connector portion 53 are formed to have shapes mechanically connectable to each other. The fifth connector portion 51 and the seventh connector portion 53 are formed to have shapes which cannot be mechanically connectable to each other. The sixth connector portion 52 and the eighth connector portion 54 are formed to have shapes which cannot be mechanically connectable to each other.

As described above in the above embodiment, the first power storage stack 11 and the second power storage stack 12 are formed of the power storage elements having the same open circuit voltage, and the third power storage stack 13 and the fourth power storage stack 14 are formed of the power storage elements having the same open circuit voltage. However, the first power storage stack 11 and the third power storage stack 13 are formed of the power storage elements having the different open circuit voltages.

Referring to FIG. 14, no conductor is connected to the terminal A3, the terminal B3, the terminal C3, and the terminal D3 included by the fifth connector portion 51. No conductor is connected to the terminal A1, the terminal B1, the terminal C1, and the terminal D1 included by the sixth connector portion 52. Referring to FIG. 15, the terminal A1 and the terminal B1 in the seventh connector portion 53 are connected through a conductor 531 to provide a closed circuit. The terminal C1 and the terminal D1 in the seventh connector portion 53 are connected through a conductor 532 to provide a closed circuit. Referring to FIG. 16, no conductor is connected to the terminal A3, the terminal B3, the terminal C3, and the terminal D3 included by the eighth connector portion 54.

Referring to FIG. 14, since the fifth circuit 91 has no conductor and is an open circuit, no signal is output from the fifth circuit 91 to the monitor unit 80. Referring to FIG. 15, since the fifth connector portion 51 and the seventh connector portion 53 have shapes which are not matched, they cannot be connected mechanically.

Referring to FIG. 16, since the eighth connector portion 54 and the sixth connector portion 52 have shapes which are not matched, they cannot be connected mechanically. Referring to FIG. 17, a signal is output from the terminal A1 and the terminal B1 in a sixth circuit 92 to the monitor unit 80. A signal is output from the terminal C1 and the terminal D1 in a sixth circuit 92 to the monitor unit 80.

The monitor unit 80 references the data table in FIG. 18 to specify the types of the mutually installed power storage stacks. In the present embodiment, it is determined that the installation is correct in the case 1 and that the stacks are of the type made by company A. The installation is not achieved in the case 2 and the case 3. It is determined that the installation is correct in the case 4 and that the stacks are of the type made by company B.

The monitor unit 80 includes a CPU or an MPU which makes these determinations. However, at least part of the processing realized in the CPU or the MPU may be performed with circuit by an ASIC circuit. When the installation is erroneous, the monitor unit 80 may prohibit the use of the power storage apparatus 10.

Since the two conductors including the conductor 531 and the conductor 532 are provided for the seventh connector portion 53, the determination of the type of the stack can be reliably performed even when one of the conductors is broken. If one of the conductors is broken, the third power storage stack 13 may be handled as a defective item.

According to the above configuration, it is possible to determine easily whether or not the erroneous installation occurs in replacing the power storage stacks mounted on the vehicle. Since this can achieve the uniform open circuit voltage of the power storage elements included in the power storage apparatus 10, a reduction in the estimation accuracy of the SOC can be suppressed.

The invention claimed is:

1. A diagnostic apparatus for erroneous installation of power storage stacks comprising:
   a first information transmission line that is mounted on a first power storage stack and transmits information taken from the first power storage stack, the first information transmission line different from a line for charging and discharging the first power storage stack;
   a first connector portion that is connected to the first information transmission line and includes first terminals;
   a second information transmission line that is mounted on a second power storage stack and transmits information taken from the second power storage stack, the second power storage stack capable of electrical connection to the first power storage stack, the second information transmission line different from a line for charging and discharging the second power storage stack;

a second connector portion that is connected to the second information transmission line and includes second terminals and second conductors connected to the second terminals; and a third connector portion that is mounted on a third power storage stack and includes third terminals and third conductors connected to the third terminals, the third conductors having a pattern different from a pattern of the second conductors, the third power storage stack restricted from electrical connection to the first power storage stack, wherein when the first connector portion and the second connector portion are mechanically connected to each other, a circuit including the second conductors outputs a first signal, and when the first connector portion and the third connector portion are mechanically connected to each other, a circuit including the third conductors outputs a second signal different from the first signal.

2. The diagnostic apparatus according to claim 1, wherein the first power storage stack includes a plurality of first power storage elements, the second power storage stack includes a plurality of second power storage elements, the third power storage stack includes a plurality of third power storage elements, the first power storage element and the second power storage element have the same open circuit voltage, and the first power storage element and the third power storage element has different open circuit voltages.

3. The diagnostic apparatus according to claim 1, wherein the first information transmission line and the first connector portion are provided for a first bus bar module included in the first power storage stack, the second information transmission line and the second connector portion are provided for a second bus bar module included in the second power storage stack, and the third connector portion is provided for a third bus bar module included in the third power storage stack.

4. The diagnostic apparatus according to claim 1, further comprising a monitor unit determining whether or not erroneous installation occurs based on the first signal or the second signal.

5. The diagnostic apparatus according to claim 4, wherein the first information transmission line transmits temperature information taken from the first power storage stack, the second information transmission line transmits temperature information taken from the second power storage stack, and the monitor unit takes the temperature information transmitted through the first information transmission line and the second information transmission line in a connection state in which the first connector portion and the second connector portion are mechanically connected to each other.

6. The diagnostic apparatus according to claim 1, further comprising a fourth connector portion that is mounted on a fourth power storage stack and includes fourth terminals and fourth conductors connected to the fourth terminals, the fourth conductors having a pattern different from the second conductors and the third conductors, the fourth power storage stack capable of electrical connection to the third power storage stack, wherein when the second connector portion and the fourth connector portion are mechanically connected to each other, a circuit including the second conductors and the fourth conductors outputs a third signal different from the first and second signals, and when the third connector portion and the fourth connector portion are mechanically connected to each other, a circuit including the third conductors and the fourth conductors outputs a fourth signal different from the first to third signals.

7. The diagnostic apparatus according to claim 1, wherein the first and second power storage stacks are placed in two stages one on another vertically in a connection state in which the first and second connector portions are mechanically connected to each other.

8. The diagnostic apparatus according to claim 1 is mounted on a vehicle.

* * * * *